(12) United States Patent
Arimatsu et al.

(10) Patent No.: US 6,874,465 B2
(45) Date of Patent: Apr. 5, 2005

(54) ENGINE INTAKE APPARATUS

(75) Inventors: Kanjo Arimatsu, Kanagawa (JP); Taro Sakai, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/676,015

(22) Filed: Oct. 2, 2003

(65) Prior Publication Data

US 2004/0065296 A1 Apr. 8, 2004

(30) Foreign Application Priority Data

Oct. 3, 2002 (JP) ........................................ 2002-290750

(51) Int. Cl.[7] ............................ F02B 31/06; F02B 31/08
(52) U.S. Cl. .................... 123/306; 123/308; 123/432; 123/188.14
(58) Field of Search ............................. 123/306, 308, 123/432, 188.14

(56) References Cited

U.S. PATENT DOCUMENTS

| | | | | |
|---|---|---|---|---|
| 4,811,231 A | * | 3/1989 | Hataoka et al. | 123/188.14 |
| 4,930,468 A | * | 6/1990 | Stockhausen | 123/188.14 |
| 5,267,543 A | * | 12/1993 | Novak et al. | 123/306 |
| 5,370,098 A | * | 12/1994 | Iida | 123/306 |
| 5,878,712 A | * | 3/1999 | Wolters et al. | 123/308 |
| 6,484,690 B2 | * | 11/2002 | Tokuyasu et al. | 123/306 |
| 6,575,133 B2 | * | 6/2003 | Ries-Mueller et al. | 123/306 |

FOREIGN PATENT DOCUMENTS

| | | |
|---|---|---|
| JP | 6-159079 A | 6/1994 |
| JP | 2002-54535 A | 2/2002 |

OTHER PUBLICATIONS

U.S. Appl. No. 10/676,077, filed Oct. 2, 2003, Sakai et al.

* cited by examiner

*Primary Examiner*—Erick Solis
(74) *Attorney, Agent, or Firm*—Foley & Lardner LLP

(57) ABSTRACT

An intake apparatus for an internal combustion engine includes an intake port leading to an engine cylinder. The intake port is divided into first and second passage section by a partition extending in the intake port in a longitudinal direction of the intake port. A gas motion control valve is arranged to open and close an upstream end of the second passage section. A connection passage connects an upstream end portion of the second passage section to the first passage section.

18 Claims, 9 Drawing Sheets

ENGINE INTAKE APPARATUS

BACKGROUND OF THE INVENTION

The present invention relates to intake apparatus or system for an internal combustion engine, and more specifically to an intake apparatus including an intake port for increasing incylinder gas motion such as tumble or swirl.

Gas motion in engine cylinder such as tumble or swirl is one of important factors to achieve stable combustion of diluted air/fuel mixture in a spark ignition internal combustion engine. Accordingly, engines of some types require an intake system which can increase incylinder gas motion in wider engine operating region.

A published Japanese Patent Application Kokai Publication No. 2002-54535 shows a gas motion control valve to increase incylinder gas flow by closing a half of the section of an intake port. A published Japanese Patent Application Kokai Publication No. H06(1994)-159079 shows an intake system including a partition dividing an intake port into upper and lower halves, and a gas motion control valve closing the lower half of the intake port, to increase a tumble ratio.

SUMMARY OF THE INVENTION

Such a gas motion control valve is arranged to produce an incylinder tumbling flow by decreasing an open area ratio that is a ratio of an effective flow passage sectional area to an entire flow passage area of an intake port. However, as the open area ratio becomes smaller, the flow resistance increases, and the amount of intake air that a cylinder can take in becomes smaller. Therefore, an engine operating region in which an incylinder flow is increased by a gas motion control valve is limited to a relatively narrow range.

It is an object of the present invention to provide an intake apparatus for increasing incylinder gas motion without decreasing the open area ratio of an intake port excessively.

According to one aspect of the present invention, an intake apparatus for an internal combustion engine, comprises a main section defining an intake port leading to a cylinder of the engine through an intake valve located at a downstream end of the intake port; and a flow regulating section to regulate an intake air flow in the intake port. The flow regulating section includes; a partition extending in the intake port in a longitudinal direction of the intake port, and dividing the intake port into first and second passage sections; a gas motion control valve arranged to open and close an upstream end of the second passage section; and a connection passage connecting an upstream end portion of the second passage section to the first passage section.

According to another aspect of the invention, an internal combustion engine comprises: an engine block member defining an engine cylinder and an intake port leading to the cylinder; an intake valve to open and close a downstream end of the intake port; a gas motion control valve provided in the intake port and arranged to reduce an open sectional area of the intake port to produce a low pressure region in the intake port; and a partition extending in the intake port in a longitudinal direction of the intake port between the downstream end of the intake port and the gas motion control valve, and dividing the intake port into a first passage section and a second passage section which is opened and closed by the gas motion control valve. The partition includes an upstream end portion defining a connection passage connecting an upstream end portion of the second passage section to the low pressure region produced in the first passage section to promote recirculating flow of intake air in the second passage section from a downstream end of the second passage section to the upstream end portion of the second passage section, and from the upstream end portion to the first passage section when the second passage section is closed by the gas motion control valve.

According to still another aspect of the invention, an intake apparatus for an internal combustion engine, comprises: first means for defining an intake port; second means for dividing the intake port into first and second passage sections extending in a longitudinal direction of the intake port; third means for closing an upstream end of the second passage section and forming a low pressure region in the first passage section; and fourth means for drawing intake air from a downstream end of the second passage section through the second passage section to the low pressure region in the first passage section when the upstream end of the second passage section is closed.

DETAILED DESCRIPTION OF THE INVENTION

Figure 1:
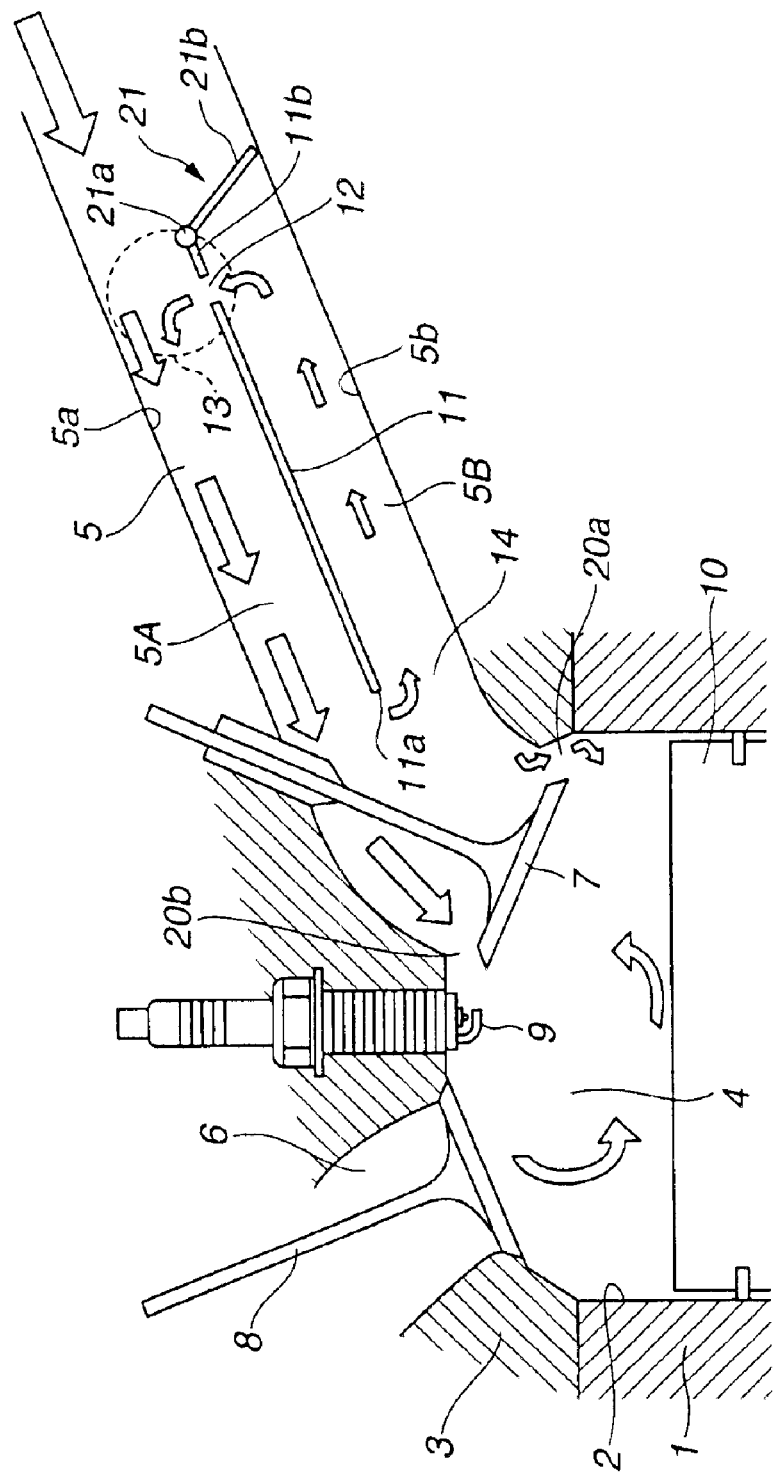
FIG. 1 is a sectional view showing an engine with an intake apparatus according to a first embodiment of the present invention.
Figure 2:
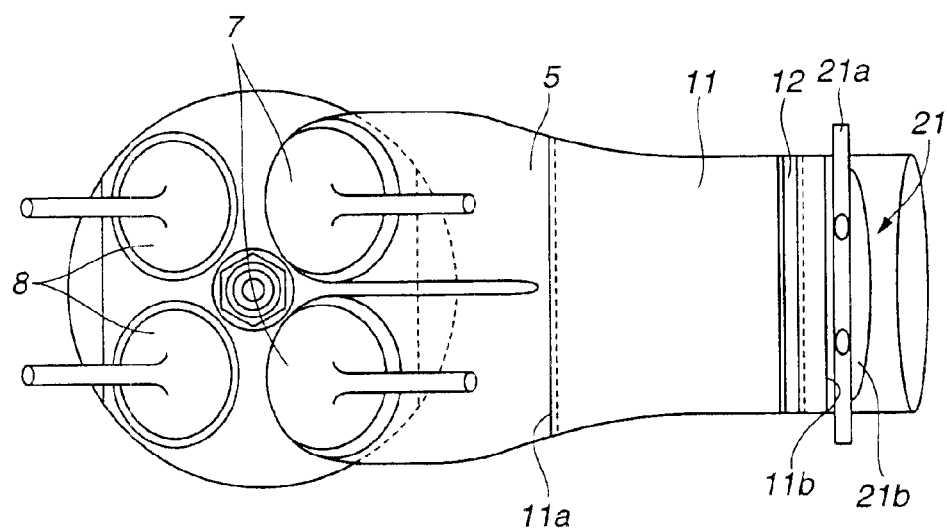
FIG. 2 is a plan view of the intake apparatus of FIG. 1 as viewed from above.

FIGS. 1 and 2 show a part of an internal combustion engine having an intake apparatus according to a first embodiment of the present invention. The engine of this example is an incylinder direct injection spark ignition engine. The intake apparatus or system is designed to strengthen an incylinder gas motion which, in this example, is tumble.

A cylinder block 1 is formed with a plurality of cylinders 2 having a cylindrical shape. A cylinder head 3 closes the upper ends of the cylinders 2. Cylinder head 3 is formed with a plurality of recesses each defining a combustion chamber 4. In this example, combustion chamber 4 of each cylinder is of the pentroof type, and having two sloping surfaces. As shown in FIG. 1, an intake port 5 extends to a downstream end opening in one of the two sloping surfaces of combustion chamber 4. An exhaust port 6 opens in the other sloping surface of combustion chamber 4. An intake valve 7 shown in FIG. 1 is arranged to open and close the downstream end of intake port 5. An exhaust valve 8 is arranged to open and close the end of exhaust port 6. In this example, a downstream end portion of intake port 5 is bifurcated, and has two branches each opening into combustion chamber 4. Accordingly, each cylinder has two intake valves 7 for opening and closing the downstream ends of two branches of intake port 5. Similarly, each cylinder has two exhaust valves 8. A spark plug 9 is provided at the center of combustion chamber surrounded by these four valves 7 and 8. A piston 10 is received in each cylinder 2. In FIG. 1, piston 10 is shown to have a flat top. However, the piston crown may be designed to have various shapes according to various requirements, such as requirement for stratified charge combustion. In an up-down (axial) direction of each cylinder, piston 10 moves upward toward spark plug 9, and moves downward away from spark plug 9.

The intake apparatus shown in FIGS. 1 and 2 includes a partition 11 extending in the longitudinal direction of intake port 5 and dividing the cross section of intake port 5 into an upper region and a lower region. In this example, partition 11 is a metal plate formed as an insert in an operation of casting cylinder head 3, and completed as an integral part of the casting. A downstream end 11a of partition 11 is located near intake valve 7. In the example shown in FIG. 1, the portion of intake port 5 receiving partition 11 extends straight in the longitudinal direction of intake port 5, and accordingly partition 11 is in the form of a flat plate extending straight in the longitudinal direction of intake port 5. However, intake port 5 may be curved, and partition 11 may be curved along the curved section of intake port 5.

"Upper" means "higher" in position in an axial direction of cylinder 2 from the position of the crankshaft toward the combustion chamber 4. Intake port 5 is an air passage which may be formed only in cylinder head 3. Alternatively, intake port 5 may be formed in cylinder head 3 and an external member, such as an intake manifold, fixed to cylinder head 3.

Partition 11 divides intake port 5 into an upper fluid passage section 5A formed between partition 11 and upper inside wall surface 5a, and a lower fluid passage section 5B formed between partition 11 and lower inside wall surface 5b of intake port 5. A gas motion control valve 21 is provided for each cylinder, and arranged to open and close an upstream end of lower fluid passage section 5B. A valve shaft 21a of gas motion control valve 21 is located on an extension of partition 11 on the upstream side of partition 11. In the example of FIG. 1, valve shaft 21 is located at a position adjacent to an upstream end 11b of partition 3, on the upstream side of the upstream end 11b of partition 3. One end of a valve element 21b is supported by valve shaft 21a. Valve shaft 21a is connected with an actuator (not shown). Gas motion control valve 21 is controlled to a closed position shown in FIG. 1 in an engine operating situation to strengthen tumble. In the closed position to close the upstream end of second passage section 5B as shown in FIG. 1, valve element 21b is so inclined as to guide the intake flow toward upper inside wall surface 5a into the first passage section 5A on the upper side. In an engine operating region such as a high speed high load region where the intake air quantity becomes greater, gas motion control valve 21 is brought to an open position at which valve element 21b extends in the longitudinal direction of intake port 5 (along the flow direction of the intake air). Gas motion control valve 21, when in the open position, extends continuously from upstream end 11b of partition 11, in line with partition 11 along the flow direction, so that the passage resistance becomes minimum.

In this example, a connection passage 12 is opened in an upstream end portion of partition 11 near the upstream end 11b. As shown in FIG. 2, connection passage 12 is in the form of a slit extending in the direction of the cylinder row (in a direction perpendicular to the longitudinal direction of intake port 5).

The thus-constructed intake system is operated as follows: On intake stroke, intake valve 7 is opened and piston 10 descends in the downward direction in cylinder 2. In this case, intake air flows into cylinder 2 through an open aperture around intake valve 7. If, in this case, gas motion control valve 21 is in the open position, intake air flows through both of upper and lower passage sections 5A and 5B, and the intake air flows into cylinder 2 uniformly around intake valve 7. Therefore, the incylinder gas flow is relatively weak.

If, on the other hand, gas motion control valve 21 is in the closed position as shown in FIG. 1, second passage section 5B is closed, and the intake air flows toward cylinder 2 only through upper passage section 5A. Specifically, an intake air stream alongside upper inside wall surface 5a of intake port 5 is increased whereas an intake air stream alongside lower inside wall surface 5b of intake port 5 is decreased. Therefore, the intake flow rate is smaller and the flow velocity is lower in a lower portion 20a of the open aperture between intake valve 7 and the outer circumference of the cylinder 2. In an upper portion 20b of the aperture formed between intake valve 7 and spark plug 9, the intake flow rate is great and the flow velocity is high. In the cylinder 2, there is formed a strong tumbling fluid motion as shown by arrows in FIG. 1 (so-called forward tumble) flowing from the intake side of intake valves 7 to the exhaust side of exhaust valves 8, and toward the piston crown. Moreover, gas motion control valve 21 in the closed state as shown in FIG. 1 serves as a throttle portion throttling the fluid passage only to upper passage section 5A, and thereby produces a local low pressure region 13 in upper passage section 5A at a position shortly on the downstream side of the upstream end 11b of partition 11. Connection passage 12 is opened in this low pressure region 13, and there is formed a pressure difference between a downstream open end 14 of lower passage section 5B and connection passage 12. Because of this pressure difference, part of the intake air is taken in from downstream open end 14, into lower passage section 5B, and caused to flow backward to the upstream side through lower passage section 5B, and discharged through connection passage 12 into the low pressure region 13 in upper passage section 5A. Therefore, most of intake air flows along upper inside wall surface 5b to intake valve 7. Consequently, the intake air stream through upper portion 20b of the aperture formed between intake valve 7 and spark plug 9 is further increased, and the intake air stream through the lower portion 20a of the open aperture between intake valve 7 and the outer circumference of the cylinder 2 is decreased. Thus, this intake apparatus can further increase the incylinder tumble. This intake apparatus can promote the tumble in the cylinder effectively, by strengthening the upper intake flow stream, and on the other hand by reducing the lower intake stream flowing along the lower inside wall surface 5a, into cylinder 2 in such direction as to impede the incylinder tumbling motion.

In the example of FIG. 1, intake port 5 is divided by partition 11, into upper and lower passage sections 5A and 5B to increase tumble. However, partition 11 can be oriented in various ways to strengthen the incylinder swirling fluid flow or to strengthen an incylinder fluid motion intermediate between the tumble and swirl.

Figure 3:
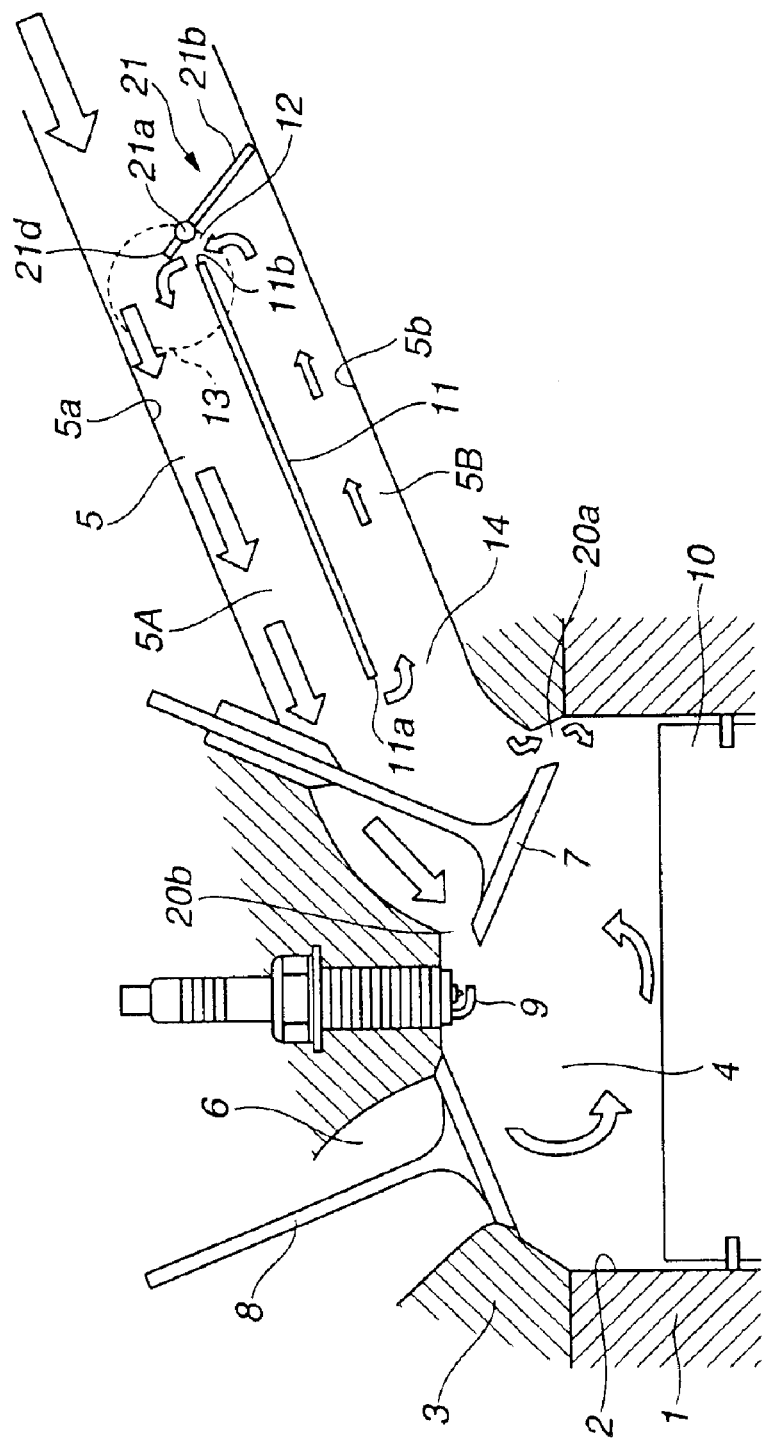
FIG. 3 is a sectional view showing an engine with an intake apparatus according to a second embodiment of the invention.
Figure 4:
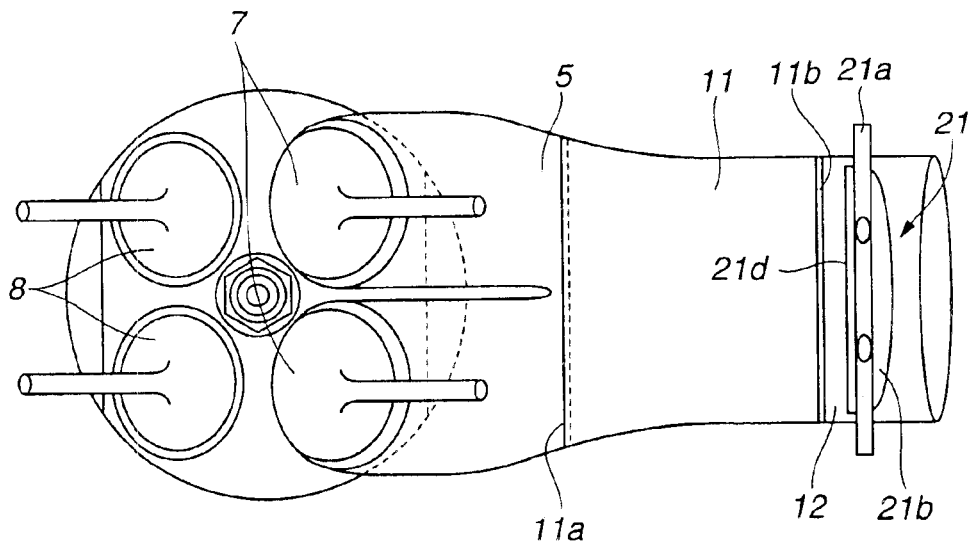
FIG. 4 is a plan view of the intake apparatus of FIG. 3 as viewed from above.

FIGS. 3 and 4 show an intake apparatus according to a second embodiment of the present invention. This intake apparatus is substantially identical to the intake apparatus of FIG. 1 in most points as shown by using the same reference numerals. In the second embodiment, unlike the first embodiment of FIGS. 1 and 2, a connection passage 12 is defined as an interspace between the upstream end 11b of a partition 11 and a valve shaft 21a of a gas motion control valve 21. There is formed no slit in partition 11. Valve shaft 21a is located on an extension of partition 11, and slightly spaced from upstream end 11b of partition 11. A valve element 21b of gas motion control valve 21 includes a main portion (or first valve portion) for opening and closing the upstream end of lower passage section 5B. In addition to the main portion extending in one direction from valve shaft 21a, the valve element 21b further includes an extension portion (or second valve portion) 21d extending in the opposite direction from valve shaft 21a. The extension portion 21d is so shaped and sized to snugly close the connection passage 12 defined between upstream end 11b of partition 11 and valve shaft 21a when gas motion control valve 21 is in the open position in which valve element 21b including extension portion 21d is in alignment with partition 11. The projecting length of extension portion 21d is approximately equal to the distance between upstream end 11b of partition 11 and valve shaft 21a. In this example, valve element 21b including the main portion and extension portion 21d is shaped like a flat plate. In the open position, valve element 21b extends continuously from upstream end 11b of flat partition 11 with almost no clearance, like a continuous flat partition wall.

In the closed position in which the main portion of valve element 21b closes the upstream end of lower passage section 5B, the interspace between the upstream end 11b of partition 11 and valve shaft 21a is opened, as connection passage 12, to a low pressure region 13 formed by gas motion control valve 21 in the closed position. Therefore, like the first embodiment shown in FIGS. 1 and 2, part of the intake air is recirculated through lower passage section 5B from downstream end 14 to connection passage 12. Specifically in the second embodiment shown in FIG. 3, the extension portion 21d projects upward in upper passage section 5A, and helps produce lower pressure region 13 effectively, so that the intake recirculation is ensured through connection passage 12. In the closed position closing second passage section 5B, the plate valve element 21b of gas motion control valve 21 is slightly inclined so as to guide intake air into first passage section 5A toward upper inside wall surface 5a.

When gas motion control valve 21 is put in the open position in the high speed high load engine operating region, valve element 21b extends rectilinearly from partition 11 so as to form a flat continuous partition wall to prevent an increase of intake flow resistance. At the same time, extension portion 21d closes connection passage 12, and thereby restrains disturbance in intake air streams. Even if extension portion 21d is shorter than the distance between upstream end 11b of partition 11 and valve shaft 21a, extension portion 21d closes a part of connection passage 12 when gas motion control valve 21 is in the open position.

Figure 5:
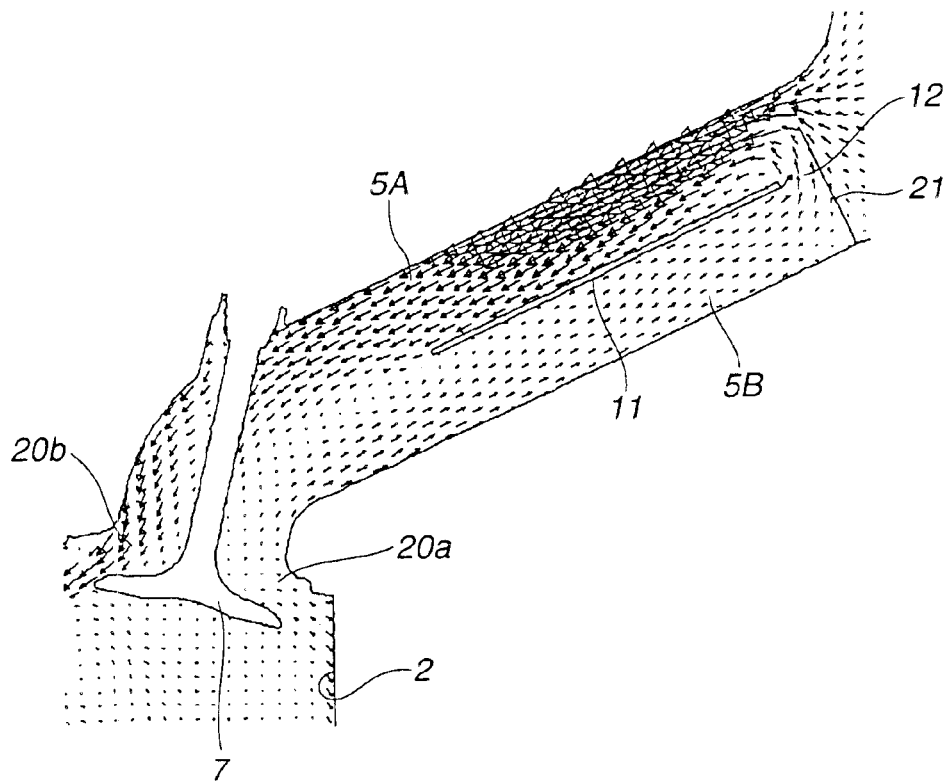
FIGS. 5 and 6 are schematic sectional views illustrating intake air streams in an intake port in the example of FIG. 3, and in an intake port in a comparative example.
Figure 6:
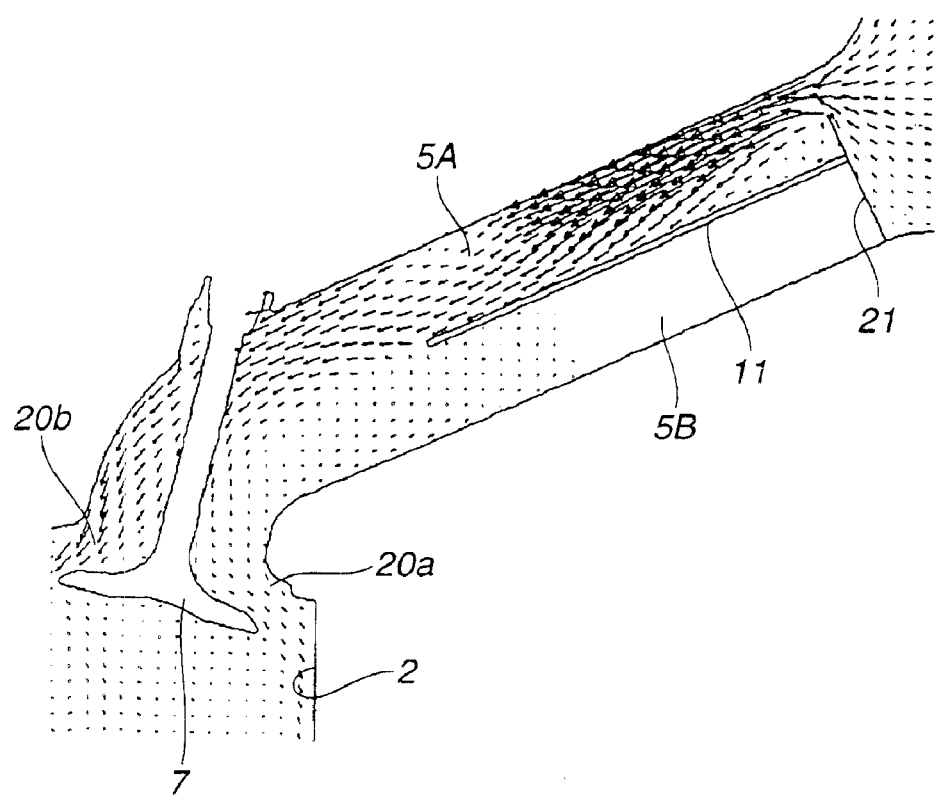

FIG. 5 shows the results of analysis of actual intake air flow in an intake apparatus according to the second embodiment. In FIG. 5, the speed and direction of fluid flow in each of points are shown as a vector by a small arrow. The density of arrows indicates the flow rate. The flow rate is high in a region in which arrows are dense, and low in a region in which arrows are coarse. FIG. 6 shows intake air flow in a comparative example in which the connection passage 12 is eliminated. The arrangement of FIG. 6 corresponds to an intake system of earlier technology in which the intake air flow is deflected to one side merely by a partition wall 11 and a gas motion control valve 21. In both examples of FIGS. 5 and 6, the opening degree of gas motion control valve 21 is held at the same value (about 20%).

As evident from comparison between FIGS. 5 and 6, a considerable amount of intake air diffuses downward on the downstream side of the downstream end 11a of partition 11 in the example of FIG. 6, and flows through the lower open portion 20a on the lower side of intake valve 7 into the cylinder. In lower passage section 5B, the intake air is almost motionless and stagnant. In the case of FIG. 5, by contrast, intake air is recirculated from a lower region near intake valve 7. Therefore, the intake flow through lower open portion 20a is reduced significantly, and hence the flow through upper open portion 20b is increased correspondingly. Thus, the arrangement of FIG. 5 can increase the incylinder tumble effectively.

Figure 7A:
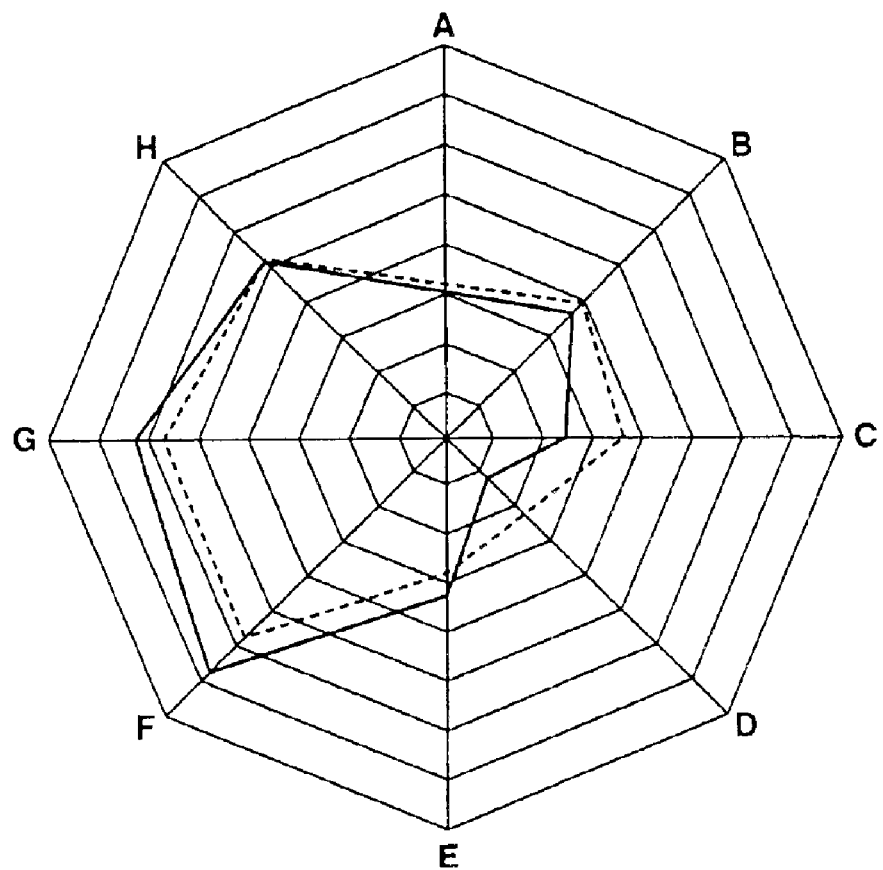
FIG. 7A is a diagram showing flow distribution around an intake port in the example of FIG. 3.
Figure 7B:
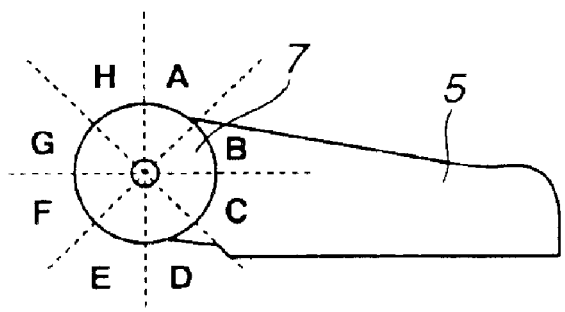
FIG. 7B is a plan view showing eight sectors used in FIG. 7A.

FIGS. 7A and 7B show the results of analysis of the intake air flow rate around intake valve 7. The circumference of 360° around intake valve 7 is divided into 8 sectors A~H of 45°, and the flow rate is plotted for each sector. Sectors B~C correspond to the lower open portion 20a, and sectors F~G correspond to the upper open portion 20b. In a characteristic of the example of FIG. 5 shown by solid lines in FIG. 7A, the flow rate is decreased in B~C sectors, and the flow rate is increased in sectors F~G, as compared to a characteristic of the comparative example of FIG. 6, shown by broken lines in FIG. 7A. In FIG. 7A, the flow rate becomes greater in a radial outward direction from the center.

Figure 8:
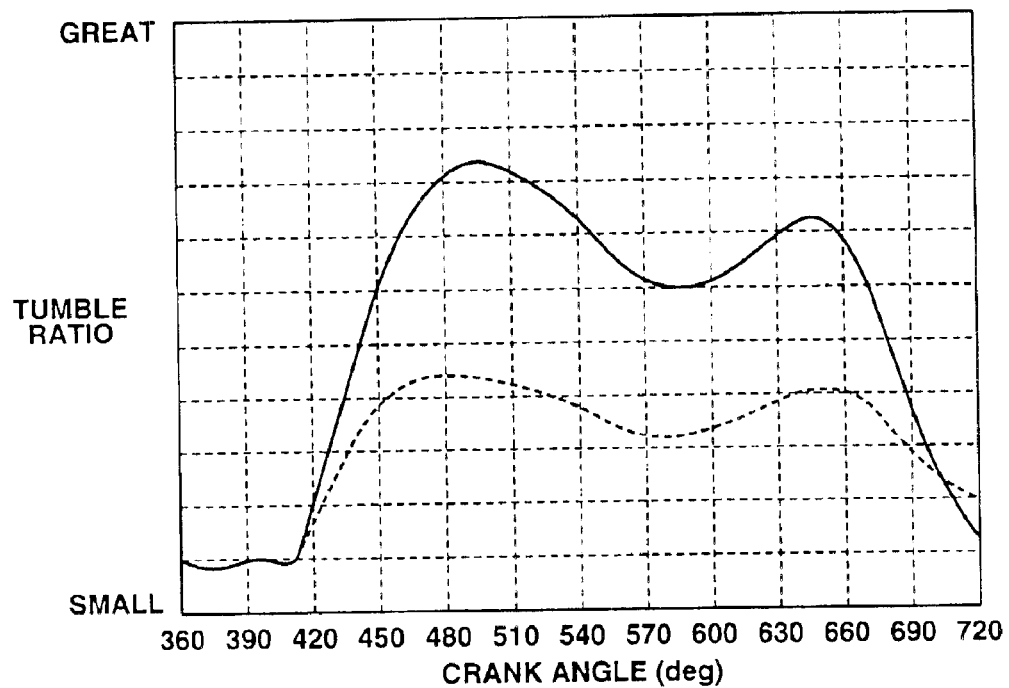
FIG. 8 is a graph showing a tumble ratio in the example of FIG. 3 in comparison with the comparative example.

FIG. 8 shows the results of analysis on a tumble ratio representing the intensity of tumble actually formed in cylinder 2. A broken line shows a characteristic in the comparative example of FIG. 6, and a solid line shows a characteristic of the practical example of FIG. 5 according to the second embodiment. As shown in FIG. 8, the intake system according to the second embodiment can increase the tumble ratio for the same open area ratio or opening degree.

Figure 9:
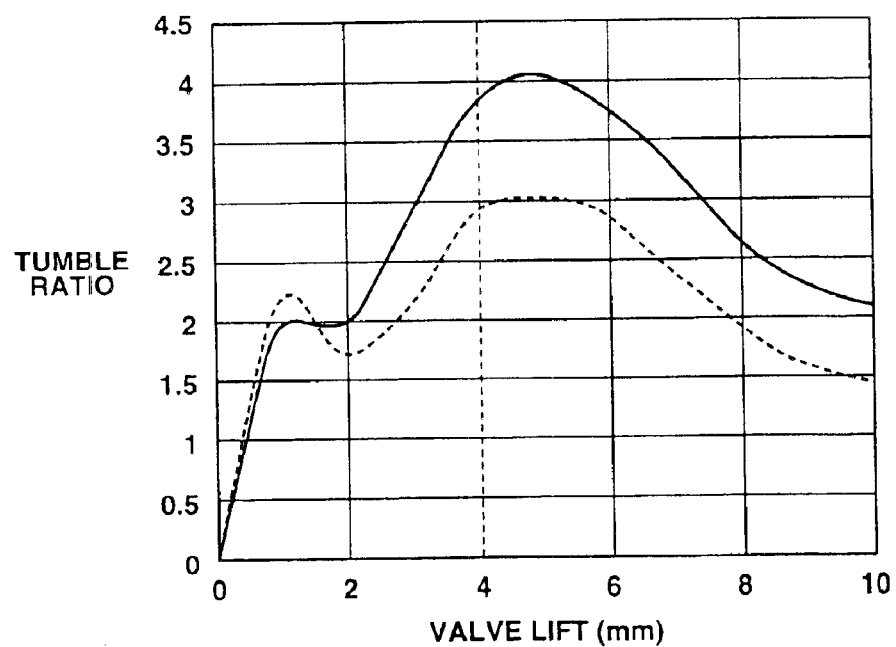
FIG. 9 is a graph showing a characteristic of the tumble ratio with respect to a valve lift, of the example of FIG. 3 in comparison with the comparative example.

FIG. 9 shows a tumble ratio of tumble formed in cylinder 2 with valve lift in the state in which the pressure difference between the inside of cylinder 2, and the upstream side of gas motion control valve 21 is held constant. A broken line shows a characteristic in the comparative example of FIG. 6, and a solid line shows a characteristic of the practical example of FIG. 5 according to the second embodiment. As evident from the comparison in FIG. 9, the intake system according to the second embodiment can further increase the tumble.

Figure 10:
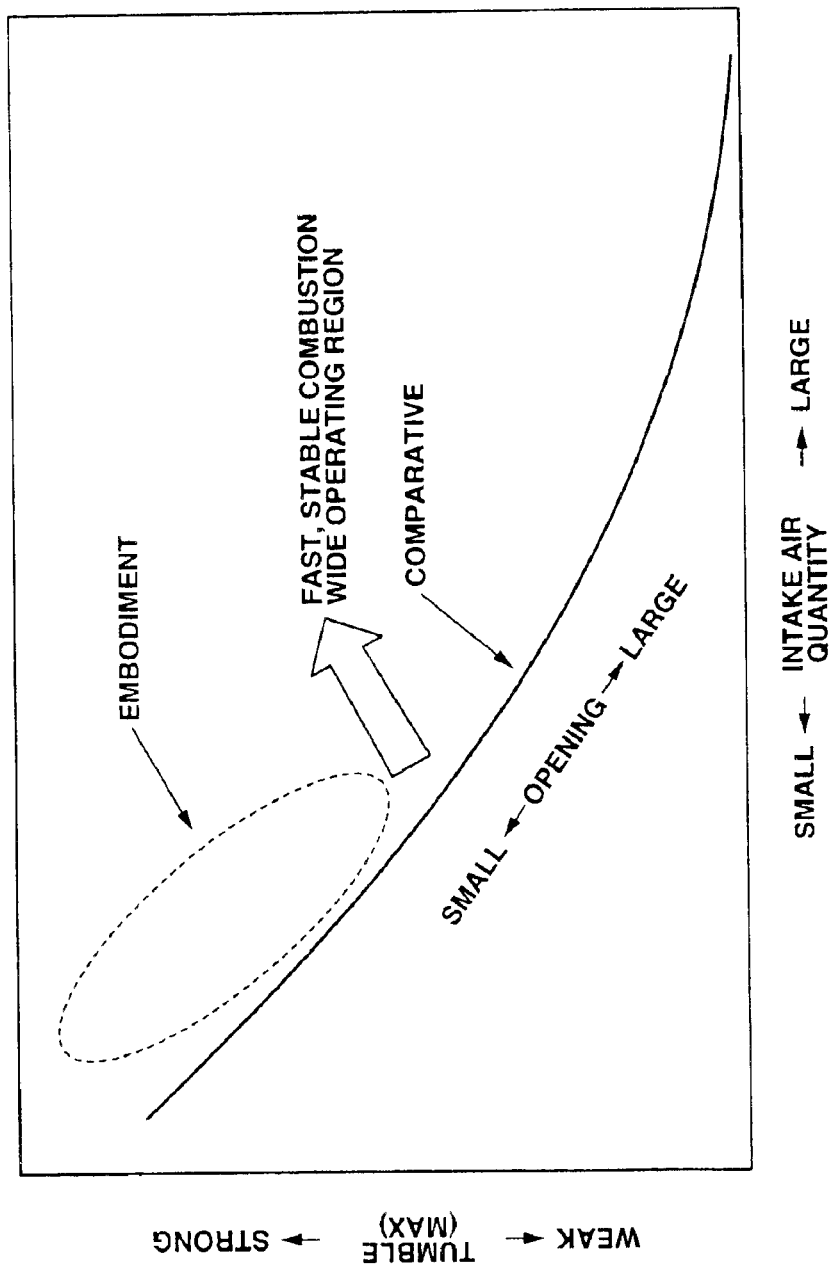
FIG. 10 is a graph showing a relation between the intensity of tumble and the intake air quantity, to illustrate effect of the example of FIG. 3.

FIG. 10 shows a relationship between the intensity of tumble and the intake air quantity in an intake system employing partition 11 and gas motion control valve 21 as in the examples of FIG. 5 and FIG. 6. In FIG. 10, the intensity of tumble is expressed as a maximum value of the tumble ratio during intake stroke. In general, the combustion tends to be slow and unstable when the tumble is weak, and the combustion tends to be fast and stable when the tumble is strong. A characteristic of the comparative example of FIG. 6 is shown by a solid line curve in FIG. 10. In the case of this characteristic, the tumble and the intake air quantity are related to each other in the following manner. As the open area ratio or opening degree is set to a smaller value, the tumble is increased but the intake air quantity becomes smaller. As the open area ratio or opening degree is increased, on the other hand, the intake air quantity is increased, but the tumble is decreased. A decrease of the intake air quantity means a reduction in the area of a tumble operating region in which tumble can be produced, that is an operating region in which gas motion control valve 21 can be closed. Inversely, an increase of intake air quantity means an increase in the area of the tumble operating region. In the example of FIG. 5 according to the second embodiment, there is formed a region shown by a broken line in FIG. 10 in which the intake air quantity can be increased with the tumble remaining constant, or the tumble is increased when the intake air quantity (or the opening degree) is held constant.

Figure 11:
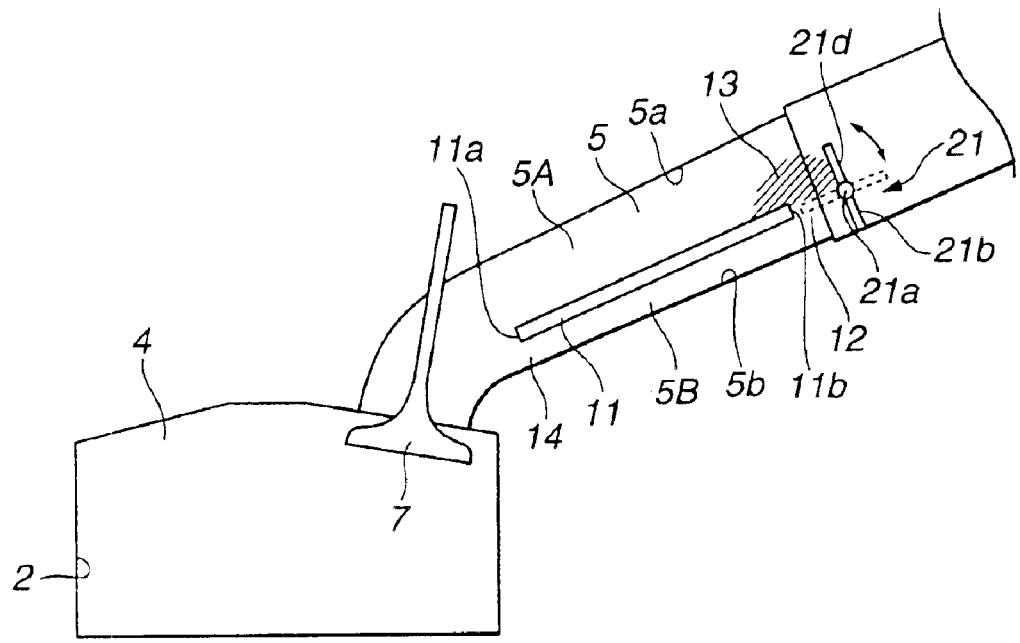
FIG. 11 is a sectional view showing an intake apparatus according to a third embodiment of the invention.

FIG. 11 shows an intake apparatus according to a third embodiment of the present invention. In the third embodiment, a partition 11 is formed at a lower position in intake port 5, so that the cross sectional area of first passage section 5A on the upper side is greater than that of second passage section 5B on the lower side. A valve shaft 21a of a gas motion control valve 21 is located on an extension of partition 11 at a position slightly spaced from the upstream end 11b of partition 11. As in the second embodiment of FIG. 3, the interspace between the upstream end 11b of partition 11 and valve shaft 21a of gas motion control valve 21 is opened as connection passage 12 when gas motion control valve 21 is in the closed position closing second passage section 5B. A valve element 21b of gas motion control valve 21 is a plate element including a first valve portion projecting in one direction from valve shaft 21a and closing the upstream end of second passage section 5B, and a second valve (extension) portion 21d projecting in the opposite direction from valve shaft 21a and projecting in first passage section 5A above partition 11 when valve element 21b is in the closed position. In the open position opening second passage section 5B shown by broken lines in FIG. 11, second valve portion 21d closes connection passage 12 formed between the upstream partition end 11b and the gas motion control valve shaft 21a.

In the third embodiment, the open area size of intake port 5 is set at a larger value when the second passage section 5B is closed by gas motion control valve 21. Therefore, the intake system according to the third embodiment makes it possible to produce incylinder tumble by closing gas motion control valve 21 in a wider engine operating range.

Figure 12:
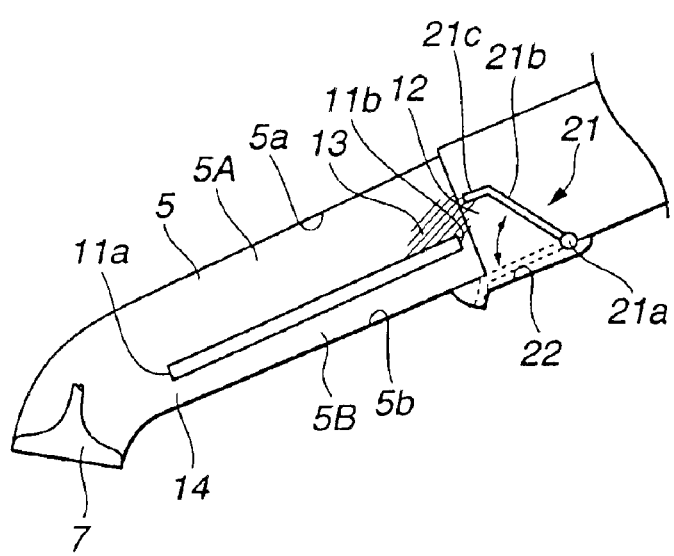
FIG. 12 is a sectional view showing an intake apparatus according to a fourth embodiment of the invention.

FIG. 12 shows an intake apparatus according to a fourth embodiment of the present invention. In the fourth embodiment, partition 11 is formed at a lower position as in the third position, and moreover a valve shaft 21a of a gas motion control valve 21 is provided at a level of a lower inside wall surface 5b of intake port 5. One end of a plate valve element 21b is attached to valve shaft 21a, and valve element 21b is swingable about valve shaft 21a within a limited angular range.

In the closed position shown by solid lines in FIG. 12, valve element 21b projects upward in intake port 5. In this position, valve element 21b closes second passage section 5B on the lower side and projects in first passage section 5A above partition 11. In this closed position, valve element 21b is spaced from the upstream end 11b of partition 11, and a connection passage 12 is formed between the upstream partition end 11b and valve element 21b. Therefore, intake air is drawn from the open downstream end 14 of second passage section 5B, and recirculated through second passage section 5B and connection passage 12, into a low pressure region 13 produced in first passage section 5A on the downstream side of the forward end of valve element 21b. Thus, this intake system can produce tumble in cylinder 2 as in the preceding embodiments. In the closed position, plate valve element 21b sloping upward so as to guide intake air stream upward smoothly toward upper inside wall surface 5a of intake port 5. Valve element 21b is swingable toward the downstream side from the closed position shown by solid lines to an open position shown by broken lines in FIG. 12. In the open position, valve element 21b lies alongside lower inside wall surface 5b in such a posture as not to disturb the flow of intake air in intake port 5, and opens second passage section 5B.

In the example shown in FIG. 12, plate valve element 21b includes a bent end portion 21c which projects in the downward direction when valve element 21b is in the closed position shown by solid lines in FIG. 12. The angle between bent end portion 21c and the main portion of valve element 21b is so set that bent end portion 21c projects in the downstream direction in the closed position. With this bent end portion 21c projecting downward, gas motion control valve 21 restrains an intake air stream over valve element 21b from flowing around valve element 21b into a region behind valve element 21b, and helps the growth of low pressure region 13 to the downstream side. In the example shown in FIG. 12, the lower inside wall surface 5b is formed with a recess 22 for receiving the valve element 21b including bent end portion 21c when valve element 21b is in the open position. When retracted in recess 22 in the open position, valve element 21b does not disturb the air flow in intake port. In the valve open position, bent end portion 21c is snugly received in a deep portion of recess 22.

In the illustrated examples, at least cylinder head 3 corresponds to a main section defining an intake port. At least cylinder block 1 and cylinder head 3 correspond to an engine block member. First means for defining an intake port corresponds to cylinder head 3, etc. Second means for dividing the intake port into first and second passage sections corresponds to partition 11. Third means for closing an upstream end of the second passage section and forming a low pressure region in the first passage section corresponds to valve element 21b. Connection passage 12 or portions defining connection passage 12 corresponds to fourth means for drawing intake air from a downstream end of the second passage section through the second passage section to the low pressure region in the first passage section when the upstream end of the second passage section is closed.

This application is based on a prior Japanese Patent Application No. 2002-290750 filed on Oct. 3, 2002. The entire contents of this Japanese Patent Applications No. 2002-290750 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An intake apparatus for an internal combustion engine, comprising:
   a main section defining an intake port leading to a cylinder of the engine through an intake valve located at a downstream end of the intake port; and
   a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section, which is a portion downstream of the gas motion control valve, to the first passage section.

2. The intake apparatus as claimed in claim 1, wherein the main section defining the intake port is a casting, and the partition is in the form of a plate inserted as a metal insert of the casting.

3. An intake apparatus for an internal combustion engine, comprising:

a main section defining an intake port leading to a cylinder of the engine through an intake valve located at a downstream end of the intake port; and a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section to the first passage section, wherein the connection passage is opened in the partition.

4. The intake apparatus as claimed in claim 3, wherein the connection passage is in the form of a slit elongated in a direction perpendicular to the longitudinal direction of the intake port.

5. An intake apparatus for an internal combustion engine, comprising:

a main section defining an intake port leading to a cylinder of the engine through an intake valve located at a downstream end of the intake port; and a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section to the first passage section, wherein the connection passage is in the form of an interspace between an upstream end of the partition and the gas motion control valve in a closed position closing the second passage section.

6. The intake apparatus as claimed in claim 3, wherein the gas motion control valve comprises a first valve portion closing the second passage section, and a second valve portion projecting in the first passage section when the second passage section is closed by the first valve portion.

7. The intake apparatus as claimed in claim 5, wherein the second valve portion of the gas motion control valve closes the connection passage when the gas motion control valve is in an open position opening the second passage section.

8. The intake apparatus as claimed in claim 6, wherein the gas motion control valve comprises a valve shaft located on an extension of the partition, and the first valve portion of the gas motion control valve projects from the valve shaft in one direction and the second valve portion extends from the valve shaft in the opposite direction.

9. The intake apparatus as claimed in claim 5, wherein the second valve portion of the gas motion control valve includes a bent end portion projecting downstream when the second valve portion projects in the first passage section.

10. The intake apparatus as claimed in claim 9, wherein the main section includes an inside wall surface of the intake port, the inside wall surface is formed with a recess receiving the gas motion control valve when the gas motion control valve opens the second passage section.

11. An intake apparatus for an internal combustion engine, comprising:

a main section defining an intake port leading to a cylinder of the engine through an intake valve located at a downstream end of the intake port; and a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section to the first passage section, wherein the connection passage is open into a low pressure region produced in the first passage section when the second passage section is closed by the gas motion control valve.

12. An intake apparatus for an internal combustion engine, comprising:

a main section defining an intake port leading to a cylinder of the engine through an intake valve located at a downstream end of the intake port; and a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section to the first passage section, wherein the gas motion control valve comprises a plate element which extends continuously from the partition when the gas motion control valve is in an open position opening the second passage section.

13. An intake apparatus for an internal combustion engine, comprising:

a main section defining an intake port leading to a cylinder of the engine through an intake valve located at a downstream end of the intake port; and a flow regulating section to regulate an intake air flow in the intake port, the flow regulating section including:

a partition extending in the intake port in a longitudinal direction of the intake port, and dividing the intake port into first and second passage sections;

a gas motion control valve to open and close an upstream end of the second passage section; and a connection passage connecting an upstream end portion of the second passage section to the first passage section, wherein the gas motion control valve comprises a valve portion projecting in the first passage section when the gas motion control valve is in a closed position closing the second passage section.

14. An intake apparatus for an internal combustion engine, comprising:
- a main section defining an intake port leading to a cylinder of the engine through an intake valve located at a downstream end of the intake port; and
- a flow regulating section to regulate an intake air flow in the intake port, the flow regulating section including:
  - a partition extending in the intake port in a longitudinal direction of the intake port, and dividing the intake port into first and second passage sections;
  - a gas motion control valve to open and close an upstream end of the second passage section; and
  - a connection passage connecting an upstream end portion of the second passage section to the first passage section,
  - wherein the gas motion control valve closes the connection passage when the gas motion control valve is in an open position opening the second passage section, and the gas motion control valve opens the connection passage when the gas motion control valve is in a closed position closing the second passage section.

15. An intake apparatus for an internal combustion engine, comprising:
- a main section defining an intake port leading to a cylinder of the engine through an intake valve located at a downstream end of the intake port; and
- a flow regulating section to regulate an intake air flow in the intake port, the flow regulating section including:
  - a partition extending in the intake port in a longitudinal direction of the intake port, and dividing the intake port into first and second passage sections;
  - a gas motion control valve to open and close an upstream end of the second passage section; and
  - a connection passage connecting an upstream end portion of the second passage section to the first passage section,
  - wherein the second passage section is smaller in sectional area than the first passage section.

16. An intake apparatus for an internal combustion engine, comprising:
- a main section defining an intake port leading to a cylinder of the engine through an intake valve located at a downstream end of the intake port; and
- a flow regulating section to regulate an intake air flow in the intake port, the flow regulating section including:
  - a partition extending in the intake port in a longitudinal direction of the intake port, and dividing the intake port into first and second passage sections;
  - a gas motion control valve to open and close an upstream end of the second passage section; and
  - a connection passage connecting an upstream end portion of the second passage section to the first passage section,
  - wherein the second passage section is located below the first passage section in an up-down direction of the cylinder of the engine.

17. An internal combustion engine comprising:
- an engine block member defining an engine cylinder and an intake port leading to the cylinder;
- an intake valve to open and close a downstream end of the intake port;
- a gas motion control valve provided in the intake port and arranged to reduce an open sectional area of the intake port to produce a low pressure region in the intake port; and
- a partition extending in the intake port in a longitudinal direction of the intake port between the downstream end of the intake port and the gas motion control valve, and dividing the intake port into a first passage section and a second passage section which is opened and closed by the gas motion control valve, the partition including an upstream end portion defining;
- a connection passage connecting an upstream end portion of the second passage section to the low pressure region produced in the first passage section to promote recirculating flow of intake air in the second passage section from a downstream end of the second passage section to the upstream end portion of the second passage section, and from the upstream end portion to the first passage section when the second passage section is closed by the gas motion control valve.

18. An intake apparatus for an internal combustion engine, comprising:
- first means for defining an intake port;
- second means for dividing the intake port into first and second passage sections extending in a longitudinal direction of the intake port;
- third means for closing an upstream end of the second passage section and forming a low pressure region in the first passage section; and
- fourth means for drawing intake air from a downstream end of the second passage section through the second passage section to the low pressure region in the first passage section when the upstream end of the second passage section is closed.

* * * * *